US012655241B2

(12) United States Patent
Kodemura

(10) Patent No.: US 12,655,241 B2
(45) Date of Patent: Jun. 16, 2026

(54) LATEX COMPOSITION AND DIP MOLDED BODY

(71) Applicant: ZEON CORPORATION, Tokyo (JP)

(72) Inventor: Junji Kodemura, Tokyo (JP)

(73) Assignee: ZEON CORPORATION, Tokyo (JP)

(*) Notice: Subject to any disclaimer, the term of this patent is extended or adjusted under 35 U.S.C. 154(b) by 573 days.

(21) Appl. No.: 18/034,215

(22) PCT Filed: Oct. 6, 2021

(86) PCT No.: PCT/JP2021/037014

§ 371 (c)(1),
(2) Date: Apr. 27, 2023

(87) PCT Pub. No.: WO2022/091728

PCT Pub. Date: May 5, 2022

(65) Prior Publication Data

US 2023/0391938 A1 Dec. 7, 2023

(30) Foreign Application Priority Data

Oct. 27, 2020 (JP) ................................ 2020-179708

(51) Int. Cl.

| | |
|---|---|
| ***C08F 236/08*** | (2006.01) |
| ***B29C 41/14*** | (2006.01) |
| ***C08K 3/06*** | (2006.01) |
| ***C08K 5/38*** | (2006.01) |
| ***C08L 7/02*** | (2006.01) |
| ***C08L 53/02*** | (2006.01) |
| ***C08L 83/12*** | (2006.01) |
| *B29K 9/00* | (2006.01) |
| *B29L 24/00* | (2006.01) |

(52) U.S. Cl.

CPC ............ *C08F 236/08* (2013.01); *B29C 41/14* (2013.01); *C08K 3/06* (2013.01); *C08K 5/38* (2013.01); *C08L 7/02* (2013.01); *C08L 53/02* (2013.01); *C08L 83/12* (2013.01); *B29K 2009/00* (2013.01); *B29L 2024/00* (2013.01); *C08L 2201/52* (2013.01)

(58) Field of Classification Search

CPC .......... C08K 3/06; C08K 5/38; C08F 236/08; C08L 7/02; C08L 83/12; C08L 53/02

USPC .......................................................... 524/571

See application file for complete search history.

(56) References Cited

U.S. PATENT DOCUMENTS

| | | | | |
|---|---|---|---|---|
| 5,871,720 | A | 2/1999 | Gutierrez et al. | |
| 2005/0271842 | A1 | 12/2005 | Triebes et al. | |
| 2008/0311409 | A1* | 12/2008 | Lipinski .................. | B29C 33/64 427/407.1 |
| 2021/0332224 | A1 | 10/2021 | Hayashi et al. | |

FOREIGN PATENT DOCUMENTS

| | | | | |
|---|---|---|---|---|
| JP | 2001523703 | A | 11/2001 | |
| JP | 2020-037635 | A | 3/2020 | |
| JP | 2021-001253 | A | 1/2021 | |
| WO | 2017220097 | A1 | 12/2017 | |
| WO | WO-2019003744 | A1 * | 1/2019 | ................ C08J 5/02 |
| WO | 2020054248 | A1 | 3/2020 | |

OTHER PUBLICATIONS

Aug. 27, 2024 Extended Search Report issued in European Patent Application No. 21885847.0.

Dec. 7, 2021 Search Report issued in International Patent Application No. PCT/JP2021/037014.

* cited by examiner

*Primary Examiner* — Deve V Hall
(74) *Attorney, Agent, or Firm* — Oliff PLC

(57) ABSTRACT

A latex composition includes a conjugated diene polymer latex and a silicone-based surfactant having a silicon atom content of 1.5 to 10 wt %. A dip-molded article is formed by dip molding the latex composition.

17 Claims, No Drawings

LATEX COMPOSITION AND DIP MOLDED BODY

TECHNICAL FIELD

The present invention relates to a latex composition having excellent storage stability and being capable of providing a dip-molded article having a thin film thickness, excellent film thickness uniformity, and excellent tensile strength, and a dip-molded article formed by dip molding the same.

BACKGROUND ART

Conventionally, it has been known that a wide variety of dip-molded articles (e.g., teats, balloons, gloves, balloons, and stalls), used in contact with the human body can be obtained by dip molding a latex composition containing rubber latex. Many of the latex compositions used for dip molding are developed for a dip molding process in which a coagulant is used, such as anode coagulant dipping and Teague coagulant dipping.

For example, Patent Document 1 discloses a dip composition for gloves containing an elastomer and a silicon-containing organic coagulant for coagulation of the dip composition for gloves. However, the technique using a coagulant as disclosed in Patent Document 1 results in a dip-molded article having a relatively large thickness.

Meanwhile, some latex compositions are used for producing a dip-molded article having a thin film thickness, such as medical gloves and condoms. From the viewpoint of producing a dip-molded article having a thin film thickness, such a dip-molded article having a thin film thickness is usually produced by direct dipping in which a coagulant is not used. As a latex composition for such a use, there is a need for a latex composition capable of providing a dip-molded article having a thin film thickness, excellent film thickness uniformity, and excellent tensile strength so that it can be suitably used in applications such as medical gloves and condoms. However, conventional latex compositions have a problem of producing a dip-molded article having insufficient film thickness uniformity when the dip-molded article was produced by a method of direct dipping and the like and has a thin film thickness. In addition, from the viewpoint of improving the productivity of dip-molded articles and the viewpoint of suppressing molding defects of the dip-molded articles, a latex composition exhibiting a suppressed occurrence of aggregates, that is, having excellent storage stability is needed.

RELATED ART DOCUMENT

Patent Document

Patent Document 1: JP 2020-37635 A

SUMMARY OF THE INVENTION

Problem to be Solved by the Invention

The present invention has been made in consideration of such circumstances, and an objective thereof is to provide a latex composition having excellent storage stability and being capable of providing a dip-molded article having a thin film thickness, excellent film thickness uniformity, and excellent tensile strength.

Means for Solving the Problems

As a result of dedicated research to achieve the aforementioned objective, the present inventor has found that the objective can be achieved by a latex composition comprising a conjugated diene polymer latex, and a silicone-based surfactant having a silicon atom content of 1.5 to 10 wt %, thereby accomplishing the present invention.

That is, the present invention provides a latex composition comprising a conjugated diene polymer latex, and a silicone-based surfactant having a silicon atom content of 1.5 to 10 wt %.

The latex composition according to the present invention preferably further comprises a cross-linking agent.

The latex composition according to the present invention preferably further comprises a cross-linking accelerator, and more preferably the cross-linking accelerator is a xanthogen compound.

In the latex composition according to the present invention, the conjugated diene polymer is preferably at least one selected from synthetic polyisoprenes, natural rubbers, and styrene-isoprene-styrene block copolymers.

In the latex composition according to the present invention, the silicone-based surfactant is preferably a polyether-modified silicone.

In the latex composition according to the present invention, the silicone-based surfactant preferably has an HLB value of 2 to 18.

In the latex composition according to the present invention, the content of the silicone-based surfactant is preferably 0.1 to 5 parts by weight with respect to 100 parts by weight of the conjugated diene polymer.

In the latex composition according to the present invention, the silicone-based surfactant is preferably a side chain-modified silicone.

The present invention also provides a dip-molded article formed by dip molding the latex composition according to the present invention.

Effects of the Invention

The present invention can provide a latex composition having excellent storage stability and being capable of providing a dip-molded article having a thin film thickness, excellent film thickness uniformity, and excellent tensile strength.

DESCRIPTION OF EMBODIMENTS

The latex composition according to the present invention comprises a conjugated diene polymer latex and a silicone-based surfactant having a silicon atom content of 1.5 to 10 wt %.

Examples of the conjugated diene polymer contained in the conjugated diene polymer latex used in the present invention include, but are not limited to, synthetic polyisoprenes, natural rubbers, styrene-isoprene-styrene block copolymers (SISs), nitrile group-containing conjugated diene copolymers, and the like. Among these, preferred is at least one selected from synthetic polyisoprenes, natural rubbers, and styrene-isoprene-styrene block copolymers (SISs), more preferred is at least one selected from synthetic polyisoprenes, protein-free natural rubbers (deproteinized natural rubbers), and styrene-isoprene-styrene block copolymers (SISs), further more preferred is at least one selected from synthetic polyisoprenes and styrene-isoprene-styrene block copolymers (SISs), and particularly preferred is a synthetic polyisoprene.

In the case where a synthetic polyisoprene is used as the conjugated diene polymer, the synthetic polyisoprene may be an isoprene homopolymer, or may be a copolymer of isoprene and a different ethylenically unsaturated monomer copolymerizable with isoprene. The content of isoprene units in the synthetic polyisoprene is preferably 70 wt % or more, more preferably 90 wt % or more, further more preferably 95 wt % or more, particularly preferably 100 wt % (homopolymer of isoprene) with respect to the total monomer units for ease of obtaining a dip-molded article which is flexible and has further enhanced tensile strength.

Examples of different ethylenically unsaturated monomers copolymerizable with isoprene include conjugated diene monomers other than isoprene, such as butadiene, chloroprene, and 1,3-pentadiene; ethylenically unsaturated nitrile monomers, such as acrylonitrile, methacrylonitrile, fumaronitrile, and α-chloroacrylonitrile; vinyl aromatic monomers, such as styrene and alkyl styrenes; ethylenically unsaturated carboxylic acid ester monomers, such as methyl (meth)acrylate (which means "methyl acrylate and/or methyl methacrylate", and hereinafter, the same applies to ethyl (meth)acrylate and the like), ethyl (meth)acrylate, butyl (meth)acrylate, and 2-ethylhexyl (meth)acrylate; and the like. One of these ethylenically unsaturated monomers copolymerizable with isoprene may be used alone, or two or more of them may be used in combination.

The synthetic polyisoprene can be obtained by a conventionally known method such as solution polymerization of isoprene optionally with a different ethylenically unsaturated copolymerizable monomer in an inert polymerization solvent using a Ziegler polymerization catalyst composed of trialkylaluminum-titanium tetrachloride or an alkyl lithium polymerization catalyst such as n-butyl lithium or sec-butyl lithium. Although the polymer solution of synthetic polyisoprene obtained by the solution polymerization may be used as it is to produce a synthetic polyisoprene latex, solid synthetic isoprene may be extracted from the polymer solution and be dissolved in an organic solvent to prepare a solution, which is then used to produce a synthetic polyisoprene latex.

In the case where a synthetic polyisoprene solution is prepared by the above-mentioned method, impurities including residual polymerization catalyst in the polymer solution may be removed. Further, an antioxidant described below may be added to the solution during or after the polymerization. Alternatively, commercially available solid synthetic polyisoprene may be used.

There are the following four types of isoprene units in the synthetic polyisoprene which differ in bonding geometry of isoprene units: cis bond unit, trans bond unit, 1,2-vinyl bond unit, and 3,4-vinyl bond unit. In order to obtain a dip-molded article having enhanced tensile strength, the content of cis bond units among the isoprene units contained in the synthetic polyisoprene is preferably 70 wt % or more, more preferably 90 wt % or more, further more preferably 95 wt % or more with respect to the total isoprene units.

The weight average molecular weight of the synthetic polyisoprene is preferably 10,000 to 5,000,000, more preferably 500,000 to 5,000,000, further more preferably 800,000 to 3,000,000 as calibrated against polystyrene standards by gel permeation chromatography. Adjusting the weight average molecular weight of the synthetic polyisoprene within the above ranges tends to result in a dip-molded article having further enhanced tensile strength, enhanced tensile elongation, and enhanced tear strength, and facilitate the production of the synthetic polyisoprene latex.

The polymer Mooney viscosity (ML1+4, 100° C.) of the synthetic polyisoprene is preferably 50 to 80, more preferably 60 to 80, further more preferably 70 to 80.

Examples of methods for providing the synthetic polyisoprene latex include (1) a method for producing the synthetic polyisoprene latex by emulsifying a solution or microsuspension of the synthetic polyisoprene, which is dissolved or finely dispersed in an organic solvent, in water in the presence of an emulsifier, followed by removal of the organic solvent, as required, and (2) a method for directly producing the synthetic polyisoprene latex by emulsion polymerization or suspension polymerization of isoprene alone or a mixture of isoprene with an ethylenically unsaturated monomer copolymerizable with isoprene in the presence of an emulsifier. The production method (1) is preferable since this method allows the use of a synthetic polyisoprene in which cis bond units occupy a high proportion of the total isoprene units, and tends to result in a dip-molded article having further enhanced tensile strength.

Examples of organic solvents usable in the production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, preferred are alicyclic hydrocarbon solvents and aliphatic hydrocarbon solvents, more preferred are pentane, cyclohexane, and n-hexane, and particularly preferred is n-hexane.

The amount of the organic solvent used is preferably 2,000 parts by weight or less, more preferably 20 to 1,500 parts by weight, further more preferably 500 to 1,500 parts by weight with respect to 100 parts by weight of the synthetic polyisoprene.

Preferred emulsifiers for use in the production method (1) are ionic emulsifiers. In particular, anionic emulsifiers are more preferred. Examples of anionic emulsifiers include fatty acid salts such as sodium laurate, potassium myristate, sodium palmitate, potassium oleate, sodium linolenate, sodium rosinate, and potassium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphate salts such as sodium lauryl phosphate and potassium lauryl phosphate; and the like.

Among these anionic emulsifiers, preferred are fatty acid salts, alkylbenzene sulfonates, alkyl sulfosuccinates, alkyl sulfate ester salts, and polyoxyethylene alkyl ether sulfate ester salts, and particularly preferred are fatty acid salts and alkylbenzene sulfonates.

A combination of at least one selected from the group consisting of alkylbenzene sulfonates, alkyl sulfosuccinates, alkyl sulfate ester salts, and polyoxyethylene alkyl ether sulfate ester salts and a fatty acid salt is preferably used to more efficiently remove a trace of residual polymerization catalyst (in particular, aluminum and titanium) derived from the synthetic polyisoprene, and the occurrence of aggregates is suppressed in the process of producing a latex composition. In particular, a combination of an alkylbenzene sulfonate and a fatty acid salt is preferably used. In this case, preferred fatty acid salts are sodium rosinate and potassium rosinate, and preferred alkylbenzene sulfonates are sodium dodecylbenzenesulfonate and potassium dodecylbenzenesulfonate. One of these emulsifiers may be used alone, or two or more of them may be used in combination.

The above use of a combination of at least one selected from the group consisting of alkylbenzene sulfonates, alkyl sulfosuccinates, alkyl sulfate ester salts, and polyoxyethylene alkyl ether sulfate ester salts and a fatty acid salt provides a latex containing the at least one selected from the group consisting of alkylbenzene sulfonates, alkyl sulfosuccinates, alkyl sulfate ester salts, and polyoxyethylene alkyl ether sulfate ester salts and the fatty acid salt.

Examples of ionic emulsifiers other than anionic emulsifiers include copolymerizable emulsifiers such as sulfo esters of α,β-unsaturated carboxylic acids, sulfate esters of α,β-unsaturated carboxylic acids, sulfoalkylaryl ethers, and the like.

Further, nonionic emulsifiers such as polyoxyethylene alkyl ethers, polyoxyethylene alkyl phenol ethers, polyoxyethylene alkyl esters, and polyoxyethylene sorbitan alkyl esters may be used in combination.

The amount of the emulsifier used in the production method (1) is preferably 0.1 to 50 parts by weight, more preferably 0.5 to 30 parts by weight with respect to 100 parts by weight of the synthetic polyisoprene. When two or more emulsifiers are used, the total amount thereof is preferably adjusted within the above ranges. Specifically, for example, when a combination of at least one selected from the group consisting of alkylbenzene sulfonates, alkyl sulfosuccinates, alkyl sulfate ester salts, and polyoxyethylene alkyl ether sulfate ester salts and a fatty acid salt is used, the total amount of the emulsifiers used preferably falls within the above ranges. By using emulsifier(s) in an amount within the above ranges, the occurrence of aggregates during emulsification can be more effectively suppressed.

When a combination of at least one selected from the group consisting of alkylbenzene sulfonates, alkyl sulfosuccinates, alkyl sulfate ester salts, and polyoxyethylene alkyl ether sulfate ester salts and a fatty acid salt is used as an anionic emulsifier, the ratio "fatty acid salt":"total of at least one selected from the group consisting of alkylbenzene sulfonates, alkyl sulfosuccinates, alkyl sulfate ester salts, and polyoxyethylene alkyl ether sulfate ester salts" on a weight basis is in the range of preferably 1:1 to 10:1, more preferably 1:1 to 7:1. The use of at least one selected from the group consisting of alkylbenzene sulfonates, alkyl sulfosuccinates, alkyl sulfate ester salts, and polyoxyethylene alkyl ether sulfate ester salts at a ratio controlled within the ranges suppresses foaming of the synthetic polyisoprene during handling thereof. This eliminates the need of processes such as long-term standing and addition of a defoamer, leading to improved work efficiency and reduced costs.

The amount of water used in the production method (1) is preferably 10 to 1,000 parts by weight, more preferably 30 to 500 parts by weight, most preferably 50 to 100 parts by weight with respect to 100 parts by weight of the organic solvent solution of the synthetic polyisoprene. Examples of the type of water used include hard water, soft water, deionized water, distilled water, zeolite water, and the like. Preferred are soft water, deionized water, and distilled water.

To emulsify the solution or microsuspension of the synthetic polyisoprene dissolved or finely dispersed in the organic solvent, in water in the presence of the emulsifier, any apparatus commercially available as an emulsifying machine or a dispersing machine can be used without limitation. The emulsifier can be added to the solution or microsuspension of the synthetic polyisoprene in any manner without limitation, and the emulsifier may be added in advance to either or both of water and the organic solvent solution or microsuspension of the synthetic polyisoprene, or may be added all at once or in portions to the liquid to be emulsified during the emulsification process.

Examples of emulsifying machines include batch emulsifying machines such as "Homogenizer" (trade name, available from IKA Works), "POLYTRON" (trade name, available from Kinematica AG), and "TK AUTO-HOMO MIXER" (trade name, available from Tokushu Kika Kogyo Co., Ltd.); continuous emulsifying machines such as "TK PIPELINE-HOMO MIXER" (trade name, available from Tokushu Kika Kogyo Co., Ltd.), "Colloid mill" (trade name, available from Shinko Pantec Co., Ltd.), "SLASHER" (trade name, available from NIPPON COKE & ENGINEERING CO., LTD.), "Trigonal wet grinder" (trade name, available from Mitsui Miike Chemical Engineering Machinery, Co., Ltd.), "CAVITRON" (trade name, available from Eurotec, Ltd.), "MILDER" (trade name, available from Pacific Machinery & Engineering Co., Ltd.), and "FINE FLOW MILL" (trade name, available from Pacific Machinery & Engineering Co., Ltd.); high-pressure emulsifying machines such as "Microfluidizer" (trade name, available from MIZUHO INDUSTRIAL CO., LTD.), "NANOMIZER" (trade name, available from NANOMIZER Inc.), and "APV GAULIN" (trade name, available from Manton-Gaulin Company); membrane emulsifying machines such as "Membrane emulsifying machine" (trade name, available from REICA Co., Ltd.); vibratory emulsifying machines such as "VIBROMIXER" (trade name, available from REICA Co., Ltd.); ultrasonic emulsifying machines such as "Ultrasonic homogenizer" (trade name, available from Branson Ultrasonics Corporation); and the like. The conditions for the emulsification process using such an emulsifying machine are not particularly limited, and the treatment temperature, the treatment time, and the like may be appropriately selected to ensure a desired dispersion state.

In the production method (1), the organic solvent is preferably removed from the emulsion prepared through the emulsification process. Preferred methods for removing the organic solvent from the emulsion are methods with which the amount of the organic solvent (preferably alicyclic hydrocarbon solvent) in the resulting synthetic polyisoprene latex can be reduced to 500 ppm by weight or less. For example, methods such as vacuum distillation, normal pressure distillation, water vapor distillation, and centrifugation can be employed.

In the method (1), the organic solvent is desirably removed from the emulsion prepared through the emulsification process to obtain the synthetic polyisoprene latex. As a method for removing the organic solvent from the emulsion, any method can be used without limitation as long as it can reduce the total content of alicyclic hydrocarbon solvents and aromatic hydrocarbon solvents as organic solvents in the resulting synthetic polyisoprene latex to 500 ppm by weight or less, and a method such as vacuum distillation, normal pressure distillation, water vapor distillation, or centrifugation can be employed.

Further, in order to increase the solids content of the synthetic polyisoprene latex, a concentration process by vacuum distillation, normal pressure distillation, centrifugation, membrane concentration, or the like may be performed as needed after removal of the organic solvent. In particular, centrifugation is preferably performed because it can increase the solids content of the synthetic polyisoprene latex and reduce the amount of residual emulsifier in the synthetic polyisoprene latex.

The centrifugation is preferably performed, for example, using a continuous centrifuge under the conditions in which the centrifugal force is preferably 100 to 10,000 G, the solids content of the synthetic polyisoprene latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. This process reduces the amount of residual emulsifier in the synthetic polyisoprene latex.

The solids content of the synthetic polyisoprene latex is preferably 10 to 70% by weight, more preferably 20 to 60% by weight, further more preferably 30 to 50% by weight. When the solids content is not less than the lower limit of the above ranges, a tear resistant dip-molded article (described later) can be produced. When the solids content is not more than the upper limit of the above ranges, the viscosity of the synthetic polyisoprene latex will not increase too high, which facilitates transfer of the synthetic polyisoprene latex through a pipe and stirring of the synthetic polyisoprene latex in a preparation tank.

The volume average particle size of the synthetic polyisoprene latex is preferably 0.1 to 10 μm, more preferably 0.5 to 3 μm, further more preferably 0.5 to 2.0 μm. Adjusting the volume average particle size within the above ranges leads to appropriate viscosity of the latex to ensure ease of handling, and can suppress formation of a film on the surface of the latex during storage of the synthetic polyisoprene latex.

Further, the synthetic polyisoprene latex may contain additives typically used in the field of latex, such as a pH adjuster, a defoamer, a preservative, a cross-linking agent, a chelating agent, an oxygen scavenger, a dispersant, and an antioxidant.

Examples of pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Among these, preferred are alkali metal hydroxides and ammonia.

As described above, a deproteinized natural rubber (protein-free natural rubber) latex may be used as the conjugated diene polymer latex. One usable protein-free natural rubber latex is that known as so-called “protein-free natural rubber latex” obtained by a conventionally known protein removal method such as a method involving decomposing proteins in a natural rubber latex using agents such as a protease and a surfactant, and removing the proteins by washing, centrifugation, or the like.

As described above, the conjugated diene polymer latex may be a styrene-isoprene-styrene block copolymer (SIS) latex. In the term “SIS”, “S” represents a styrene block, and “I” represents an isoprene block.

The SIS in the SIS latex can be prepared by a conventionally known method such as block copolymerization of isoprene and styrene in an inert polymerization solvent using an active organic metal such as n-butyl lithium as an initiator. Although the resulting polymer solution of SIS may be used as it is to produce an SIS latex, solid SIS may be extracted from the polymer solution and be dissolved in an organic solvent to prepare a solution, which is then used to produce an SIS latex. Although any method for producing the SIS latex can be used without limitation, preferred is a method for producing the SIS latex by emulsifying a solution or microsuspension of SIS, which is dissolved or finely dispersed in an organic solvent, in water in the presence of an emulsifier and removing the organic solvent as required. In this case, impurities including residual polymerization catalyst in the polymer solution after synthesis may be removed. During or after polymerization, an antioxidant (described later) may be added to the solution. Alternatively, commercially available solid SIS may be used.

Examples of usable organic solvents include the same solvents as those listed for the synthetic polyisoprene. Preferred are aromatic hydrocarbon solvents and alicyclic hydrocarbon solvents, and particularly preferred are cyclohexane and toluene. The amount of the organic solvent is typically 50 to 2,000 parts by weight, preferably 80 to 1,000 parts by weight, more preferably 10 to 500 parts by weight, further more preferably 150 to 300 parts by weight relative to 100 parts by weight of the SIS.

Examples of emulsifiers include the same emulsifiers as those listed for the synthetic polyisoprene. Preferred are anionic emulsifiers, and particularly preferred are potassium rosinate and sodium dodecylbenzenesulfonate.

The amount of the emulsifier is preferably 0.1 to 50 parts by weight, more preferably 0.5 to 30 parts by weight with respect to 100 parts by weight of the SIS. The use of the emulsifier in an amount within the above ranges can improve storage stability of the resulting latex.

The amount of water in the aforementioned method for producing the SIS latex is preferably 10 to 1,000 parts by weight, more preferably 30 to 500 parts by weight, most preferably 50 to 100 parts by weight with respect to 100 parts by weight of the organic solvent solution of the SIS. Examples of the type of water to be used include hard water, soft water, deionized water, distilled water, zeolite water, and the like. Further, any of polar solvents typified by alcohols such as methanol may be used in combination with water.

Examples of apparatuses for emulsifying the organic solvent solution or microsuspension of the SIS in water in the presence of the emulsifier include the same apparatuses as described above for the synthetic polyisoprene. The emulsifier can be added in any manner without limitation, and the emulsifier may be added in advance to either or both of water and the organic solvent solution or microsuspension of the SIS, or may be added all at once or in portions to the liquid to be emulsified during the emulsification process.

In the aforementioned method for producing the SIS latex, the SIS latex is preferably obtained by removing the organic solvent from the emulsion prepared through the emulsification process. The organic solvent can be removed from the emulsion by any method without limitation, and a method such as vacuum distillation, normal pressure distillation, water vapor distillation, or centrifugation can be employed.

Further, in order to increase the solids content of the SIS latex, a concentration process by vacuum distillation, normal pressure distillation, centrifugation, membrane concentration, or the like may be performed as needed after removal of the organic solvent.

The solids content of the SIS latex is preferably 30 to 70 wt %, more preferably 50 to 70 wt %. When the solids content is not less than the lower limit of the above ranges, a tear resistant dip-molded article can be produced. When the solids content is not more than the upper limit of the above ranges, the viscosity of the synthetic polyisoprene latex will not increase too high, which facilitates transfer of the SIS latex through a pipe and stirring of the SIS latex in a preparation tank.

Further, the SIS latex may contain additives generally used in the field of latex, such as a pH adjuster, a defoamer, a preservative, a cross-linking agent, a chelating agent, an oxygen scavenger, a dispersant, and an antioxidant. Examples of pH adjusters include the same pH adjusters as those described above for the synthetic polyisoprene. Preferred are alkali metal hydroxides and ammonia. In this case, although the pH of the SIS latex is not particularly limited, it is preferable, as described later, that the pH of a latex composition prepared using materials including the SIS latex be controlled to 10 or more before aging of the latex under predetermined conditions.

The content of styrene units in styrene blocks of the SIS contained in the SIS latex thus obtained is preferably 70 to 100 wt %, more preferably 90 to 100 wt %, further more preferably 100 wt % with respect to the total monomer units.

Further, the content of isoprene units in the isoprene block of the SIS is preferably 70 to 100 wt %, more preferably 90 to 100 wt %, further more preferably 100 wt % with respect to the total monomer units.

The content ratio of styrene units to isoprene units in the SIS is typically in the range of 1:99 to 90:10, preferably 3:97 to 70:30, more preferably 5:95 to 50:50, further more preferably 10:90 to 30:70 as a weight ratio of "styrene units:isoprene units".

The weight average molecular weight of the SIS is preferably 10,000 to 1,000,000, more preferably 50,000 to 500,000, further more preferably 100,000 to 300,000 as calibrated against polystyrene standards by gel permeation chromatography. Adjusting the weight average molecular weight of the SIS within the above ranges tends to result in a dip-molded article having improved balance of tensile strength and flexibility, and facilitate the production of the SIS latex.

The volume average particle size of latex particles (SIS particles) in the SIS latex is preferably 0.1 to 10 μm, more preferably 0.5 to 3 μm, further more preferably 0.5 to 2.0 μm. Adjusting the volume average particle size of the latex particles within the above ranges leads to appropriate viscosity of the latex to ensure ease of handling, and can suppress formation of a film on the surface of the latex during storage of the SIS latex.

Although the conjugated diene polymer used in the present invention may be a synthetic polyisoprene, a natural rubber, a styrene-isoprene-styrene block copolymer (SIS), a nitrile group-containing conjugated diene copolymer, or the like as described above, the conjugated diene polymer is not limited to these examples, and a butadiene polymer, a styrene-butadiene copolymer, or the like may be used.

Such a butadiene polymer may be a homopolymer of 1,3-butadiene as a conjugated diene monomer, or may be a copolymer formed by copolymerization of 1,3-butadiene as a conjugated diene monomer with a different ethylenically unsaturated monomer that is copolymerizable with 1,3-butadiene.

Further, such a styrene-butadiene copolymer may be a copolymer formed by copolymerization of 1,3-butadiene as a conjugated diene monomer with styrene, or may be a copolymer formed by copolymerization of these monomers with a different ethylenically unsaturated monomer that is copolymerizable with the former monomers and is used as required in addition to the former monomers.

The conjugated diene polymer used in the present invention may be an acid-modified conjugated diene polymer obtained through modification with a monomer having an acidic group, and is preferably a carboxy-modified conjugated diene polymer prepared through carboxy modification. Such a carboxy-modified conjugated diene polymer can be prepared by modifying the conjugated diene polymer described above with a monomer having a carboxyl group. It should be noted that in the case where an ethylenically unsaturated carboxylic acid monomer is incorporated as a different ethylenically unsaturated monomer into a nitrile group-containing conjugated diene copolymer, the modification with a monomer having a carboxyl group (described later) is not always necessary because the copolymer is already carboxy-modified.

The conjugated diene polymer can be modified with the monomer having a carboxyl group by any method without limitation. Examples thereof include graft-polymerization of the monomer having a carboxyl group onto the conjugated diene polymer in an aqueous phase. Any method can be used without limitation to graft-polymerize the monomer having a carboxyl group onto the conjugated diene polymer in an aqueous phase, and conventionally known methods may be used. One preferred example is that after the monomer having a carboxyl group and a graft polymerization catalyst was added to the conjugated diene polymer latex, the monomer having a carboxyl group is reacted with the conjugated diene polymer in the aqueous phase.

Examples of graft polymerization catalysts include, but are not limited to, inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; azo compounds such as 2,2'-azobisisobutyronitrile, azobis-2,4-dimethylvaleronitrile, and methyl azobisisobutyrate; and the like. From the viewpoint of providing a dip-molded article having further enhanced tensile strength, organic peroxides are preferable, and 1,1,3,3-tetramethylbutyl hydroperoxide is particularly preferable. One of these graft polymerization catalysts may be used alone, or two or more of them may be used in combination.

One of the graft polymerization catalysts described above may be used alone, or two or more of them may be used in combination. Although the amount of the graft polymerization catalyst used varies depending on the type thereof, it is preferably 0.1 to 10 parts by weight, more preferably 0.2 to 5 parts by weight with respect to 100 parts by weight of the conjugated diene polymer. Further, the graft polymerization catalyst can be added by any method without limitation, and any known addition method such as one-time addition, portion-wise addition, or continuous addition can be used.

Organic peroxides can be used in combination with reductants as redox polymerization initiators. Examples of such reductants include, but are not limited to, compounds containing reduced metal ions such as ferrous sulfate and cuprous naphthenate; sulfinates such as sodium hydroxymethanesulfinate; amine compounds such as dimethylaniline; and the like. One of these reductants may be used alone, or two or more of them may be used in combination.

The amount of reductant(s) added, although not particularly limited, is preferably 0.01 to 1 part by weight with respect to 1 part by weight of the organic peroxide(s).

The organic peroxides and the reductants can be added by any method without limitation, each can be added by a known addition method such as one-time addition, portion-wise addition, or continuous addition.

Although the reaction temperature during the reaction of the monomer having a carboxyl group with the conjugated diene polymer is not specifically limited, it is preferably 15 to 80° C., more preferably 30 to 50° C. The reaction time for the reaction of the monomer having a carboxyl group with the conjugated diene polymer may be appropriately set according to the aforementioned reaction temperature, and is preferably 30 to 300 minutes, more preferably 60 to 120 minutes.

The solids content of the conjugated diene polymer latex before the reaction of the monomer having a carboxyl group with the conjugated diene polymer is preferably 5 to 60 wt %, more preferably 10 to 40 wt %, although not specifically limited thereto.

Examples of monomers having a carboxyl group include ethylenically unsaturated monocarboxylic acid monomers such as acrylic acid and methacrylic acid; ethylenically unsaturated polyvalent carboxylic acid monomers such as itaconic acid, maleic acid, fumaric acid, and butene tricarboxylic acid; ethylenically unsaturated polyvalent carboxylic acid partial ester monomers such as monobutyl fumarate, monobutyl maleate, and mono-2-hydroxypropyl maleate; polyvalent carboxylic acid anhydrides such as maleic anhydride and citraconic anhydride; and the like. Ethylenically unsaturated monocarboxylic acid monomers are preferable, acrylic acid and methacrylic acid are more preferable, and methacrylic acid is particularly preferable because further remarkable effects of carboxy modification can be achieved. One of these monomers may be used alone, or two or more of them may be used in combination. It should be noted that the aforementioned carboxyl group is intended to encompass forms of salts with alkali metals, ammonia, and the like.

The amount of the monomer having a carboxyl group used is preferably 0.01 to 100 parts by weight, more preferably 0.01 to 40 parts by weight, further more preferably 0.5 to 20 parts by weight, particularly preferably 2 to 5 parts by weight with respect to 100 parts by weight of the conjugated diene polymer. When the monomer having a carboxyl group is used in an amount within the aforementioned ranges, a dip-molded article having further enhanced tensile strength can be obtained.

The monomer having a carboxyl group can be added to the conjugated diene polymer latex by any method without limitation, and any known addition method such as one-time addition, portion-wise addition, or continuous addition can be used.

Although the degree of modification of the carboxy-modified conjugated diene polymer with the monomer having a carboxyl group may be appropriately controlled according to the intended use of the conjugated diene polymer latex composition to be obtained, it is preferably 0.01 to 10 wt %, more preferably 0.2 to 5 wt %, further more preferably 0.3 to 3 wt %, particularly preferably 0.4 to 2 wt %, and may be 0.4 to 1 wt %, for example. The degree of modification is represented by the formula below. Degree of modification (wt %)=(X/Y)×100 In the formula above, X represents the weight of units of the monomer having a carboxyl group in the carboxy-modified conjugated diene polymer, and Y represents the weight of the carboxy-modified conjugated diene polymer. X can be determined, for example, by performing $^1$H-NMR analysis on the carboxy-modified conjugated diene polymer and performing a calculation based on the results of the $^1$H-NMR analysis, or by determining its acid content by neutralization titration and performing a calculation based on the resulting acid content.

The latex composition according to the present invention comprises a silicone-based surfactant having a silicon atom content of 1.5 to 10 wt % in addition to the conjugated diene polymer latex described above.

The silicone-based surfactant used in the present invention is a surfactant formed of a polymer having a polysiloxane skeleton. Examples of the silicone-based surfactant include dimethyl silicone having a main chain comprising siloxane bonds and having methyl groups at the polymer main chain terminals and the polymer side chains, and methyl hydrogen silicone in which some of the side chains are hydrogen.

As the silicone-based surfactant, preferred is a modified silicone formed by introducing a modifying group such as a polyether group, a fluoroalkyl group, a phenyl group, an alkyl group, or an aralkyl group to a base silicone such as dimethyl silicone or methyl hydrogen silicone, more preferred are a main chain terminal-modified silicone formed by introducing a modifying group to at least a main chain terminal of the base silicone, and/or a side chain-modified silicone formed by introducing a modifying group to at least some of the side chains of the base silicone, and further more preferred is the side chain-modified silicone. Hereinafter, the modified silicone formed by introducing a polyether group, a fluoroalkyl group, a phenyl group, an alkyl group, or an aralkyl group to the base silicone is referred to as "polyether-modified silicone", "fluoroalkyl-modified silicone", "phenyl-modified silicone", "alkyl-modified silicone", or "aralkyl-modified silicone", respectively. In the modified silicone, a single type of modifying group may be introduced alone, or two or more types thereof may be introduced.

The modified silicone as the silicone-based surfactant is preferably a modified dimethyl silicone formed by introducing a modifying group to dimethyl silicone as the base silicone.

The modifying group introduced to the modified silicone as the silicone-based surfactant is preferably a polyether group, a fluoroalkyl group, a phenyl group, an alkyl group or an aralkyl group, more preferably a polyether group. Specifically, the modified silicone as the silicone-based surfactant is preferably a polyether-modified silicone, a fluoroalkyl-modified silicone, a phenyl-modified silicone, an alkyl-modified silicone, or an aralkyl-modified silicone, more preferably a polyether-modified silicone.

Here, polyether group refers to a substituent containing two or more repeating units containing an ether linkage. Preferred examples thereof include organic groups mainly containing ethylene oxide units or propylene oxide units represented by $[-R^{11}(C_2H_4O)_aR^{12}]$, $[-R^{13}(C_3H_6O)_bR^{14}]$, or $[-R^{15}(C_2H_4O)_c(C_3H_6O)_dR^{16}]$ although not particularly limited thereto. $R^{11}$, $R^{12}$, $R^{13}$, $R^{14}$, $R^{15}$, and $R^{16}$ are each a hydrocarbon group, a and b are each an integer of 6 to 30, and c and d are each an integer of 1 to 20.

Specific examples of the modified silicone as the silicone-based surfactant include compounds represented by general formulae (1) to (3) below.

[Chem 1]

(1)

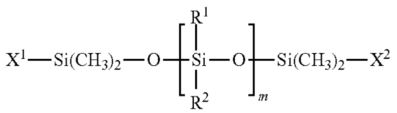

(2)

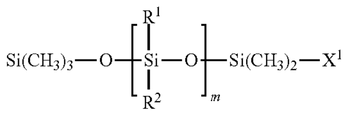

(3)

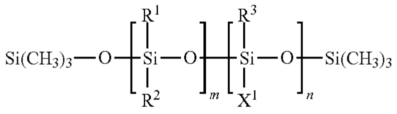

In general formulae (1) to (3), $R^1$, $R^2$, and $R^3$ are each a hydrogen atom or a methyl group, $X^1$ and $X^2$ are each a modifying group, m is an integer of 0 or more, and n is an integer of 1 or more. In general formulae (1) to (3), in the case where m is 2 or more, two or more R's may be identical to or different from each other, and two or more $R^2$s may be identical to or different from each other. Further, in general formula (3), in the case where n is 2 or more, two or more $R^3$s may be identical to or different from each other, and two or more X's may be identical to or different from each other.

General formulae (1) and (2) each represent a main chain terminal-modified silicone. General formula (3) represents a side chain-modified silicone.

In general formulae (1) and (2), R and $R^Z$ are each a hydrogen atom or a methyl group, and $R^1$ and $R^2$ are all preferably a methyl group, although not particularly limited thereto. In the case where $R^1$ and $R^2$ are all a methyl group, general formulae (1) and (2) each represent a main chain terminal-modified dimethyl silicone.

In general formula (3), $R^1$, $R^2$, and $R^3$ are each a hydrogen atom or a methyl group, and $R^1$, $R^2$ and $R^3$ are all preferably a methyl group, although not particularly limited thereto. In the case where $R^1$, $R^2$, and $R^3$ are all a methyl group, general formula (3) represents a side chain-modified dimethyl silicone.

In general formula (1), $X^1$ and $X^2$ are each a modifying group. Examples of the modifying group include a polyether group, a fluoroalkyl group, a phenyl group, an alkyl group, and an aralkyl group, and preferred is a polyether group. In the case where the modified silicone as the silicone-based surfactant is a polyether-modified silicone, for example, in general formula (1), at least one of $X^1$ and $X^2$ is a polyether group, and $X^1$ and $X^2$ are both preferably a polyether group, although not particularly limited thereto. In the case where $X^1$ and $X^2$ are both a polyether group, $X^1$ and $X^2$ may be identical polyether groups, or different polyether groups.

In general formulae (1) to (3), m is an integer of 0 or more, and preferably an integer of 1 or more, although not particularly limited thereto.

The modified silicone as the silicone-based surfactant is preferably a compound represented by general formulae (1) or (3). Preferred is a polyether-modified silicone in which $X^1$ and $X^2$ are both a polyether group in general formula (1), or a polyether-modified silicone in which $X^1$ is a polyether group in general formula (3), and more preferred is a polyether-modified silicone in which $X^1$ is a polyether group in general formula (3).

The silicon atom content in the silicone-based surfactant used in the present invention is 1.5 to 10 wt %. The latex composition according to the present invention containing the silicone-based surfactant having a silicon atom content of 1.5 to 10 wt % has excellent storage stability, and can provide a dip-molded article having a thin film thickness, excellent film thickness uniformity, and excellent tensile strength. In particular, in the case where multiple dip-molded layers are formed using the latex composition according to the present invention, when a second dip-molded layer is formed after a first dip-molded layer is formed, a layer composed of the latex composition according to the present invention can be uniformly formed on the first dip-molded layer. Thus, the formation of the second dip-molded layer can effectively suppress a defect such as a pinhole, and lead to formation of dip-molded layers as a whole (dip-molded layers composed of the first dip-molded layer and the second dip-molded layer as a whole) having excellent uniformity. As a result, the latex composition according to the present invention has excellent storage stability, and can provide a dip-molded article having a thin film thickness, excellent film thickness uniformity, and excellent tensile strength.

In the case where the silicone-based surfactant is a compound represented by any of general formulae (1) to (3), the silicon atom content in the silicone-based surfactant can be adjusted by the type of $R^1$, $R^2$, and $R^3$, the type of the modifying group, or the number of introduced modifying groups. In the case where the silicone-based surfactant is a compound represented by general formula (3), the silicon atom content in the silicone-based surfactant can be adjusted by adjusting the ratio of m and n in addition to the above ways.

The silicon atom content in the silicone-based surfactant may be 1.5 to 10 wt %, and is preferably 2 to 9 wt %, more preferably 2.5 to 7 wt %, further more preferably 3 to 5 wt %, although not particularly limited thereto. When the silicon atom content falls within the above ranges, a dip-molded article having enhanced film thickness uniformity can be obtained.

The Hydrophile-Lipophile Balance (HLB) value of the silicone-based surfactant used in the present invention is preferably 2 to 18, more preferably 8 to 17, further more preferably 10 to 16, although not particularly limited thereto. When the HLB value falls within the above ranges, a dip-molded article having further enhanced film thickness uniformity can be obtained.

In the latex composition according to the present invention, the content of the silicone-based surfactant is preferably 0.1 to 5 parts by weight, more preferably 0.3 to 3 parts by weight, further more preferably 0.5 to 1.5 parts by weight with respect to 100 parts by weight of the conjugated diene polymer, although not particularly limited thereto. When the content of the silicone-based surfactant falls within the above ranges, a dip-molded article having further enhanced film thickness uniformity can be obtained.

The latex composition according to the present invention preferably comprises a cross-linking agent in addition to the conjugated diene polymer latex and the silicone-based surfactant having a silicon atom content of 1.5 to 10 wt % described above.

As the cross-linking agent, a sulfur-based vulcanizing agent is suitably used. Examples of the sulfur-based vulcanizing agent include sulfur such as powder sulfur, flowers of sulfur, precipitated sulfur, colloid sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-morpholinodithio)benzothiazole; and the like. Among these, sulfur can be preferably used. One of the cross-linking agents may be used alone, or two or more of them may be used in combination.

The content of the cross-linking agent in the latex composition according to the present invention is preferably 0.1 to 10 parts by weight, more preferably 0.2 to 5 parts by weight, further more preferably 0.5 to 3 parts by weight with respect to 100 parts by weight of the conjugated diene polymer, although not specifically limited thereto. Controlling the content of the cross-linking agent within the above ranges can suppress an increase in the hardness of the resulting dip-molded article while further enhancing tensile strength thereof.

The latex composition according to the present invention preferably further comprises a cross-linking accelerator. As the cross-linking accelerator, a xanthogen compound is suitably used from the viewpoint of producing a dip-molded article which can suitably avoid delayed (Type IV) allergic reactions.

Although the xanthogen compound is not specifically limited, examples thereof include xanthic acids, xanthates, xanthogen disulfides (compounds with two xanthic acid molecules bound via a sulfur atom or the like), xanthogen polysulfides (compounds with three or more xanthic acid molecules bound via sulfur atoms or the like), and the like.

Such xanthates may be any salt compounds having a xanthic acid structure, and are preferably metal salts of xanthic acids, although not particularly limited thereto. Especially, suitable are compounds represented by the general formula (ROC(=S)S)x-Z (where R represents a linear or branched hydrocarbon, Z represents a metal atom, and x represents a numerical value that matches the valence of Z and is generally 1 to 4, preferably 2 to 4, particularly preferably 2). Further, among the metal salts of the xanthic acid, a zinc salt of the xanthic acid is more preferable.

Although xanthates represented by the general formula (ROC(=S)S)x-Z are not specifically limited, examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl xanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, the xanthates may be isopropyl xanthates or butyl xanthates, xanthates with x in the general formula (ROC(=S)S)x-Z being 2 or more are preferable, diisopropyl xanthates and dibutyl xanthates are more preferable, and zinc diisopropyl xanthate and zinc dibutyl xanthate are further more preferable, zinc diisopropyl xanthate is particularly preferable. One of these xanthates may be used alone, or two or more of them may be used in combination.

Xanthogen disulfides are compounds with two xanthic acid molecules bound via sulfur atoms or the like. Examples thereof include, but are not specifically limited to, dimethyl xanthogen disulfide, diethyl xanthogen disulfide, diisopropyl xanthogen disulfide, dibutyl xanthogen disulfide, dimethyl xanthogen polysulfide, diethyl xanthogen polysulfide, diisopropyl xanthogen polysulfide, dibutyl xanthogen polysulfide, and the like. Among these, diisopropyl xanthogen disulfide and dibutyl xanthogen disulfide are preferable.

Xanthogen polysulfides are compounds with three or more xanthic acid molecules bound via sulfur atoms or the like, and examples thereof include xanthogen trisulfides with three xanthic acid molecules bound via sulfur, xanthogen tetrasulfides with four xanthic acid molecules bound via sulfur, xanthogen pentasulfides with five xanthic acid molecules bound via sulfur, and the like.

One of these xanthogen compounds may be used alone, or two or more of them may be used in combination.

Further, in the present invention, a cross-linking accelerator other than xanthogen compounds may be used in place of the xanthogen compound or together with the xanthogen compound. The main component of the cross-linking accelerator (which occupies preferably 50 wt % or more, more preferably 80 wt % or more, further more preferably 99 wt % or more of the cross-linking accelerator) is preferably a xanthogen compound from the viewpoint of producing a dip-molded article which can suitably avoid delayed (Type IV) allergic reactions.

As such a cross-linking accelerator other than xanthogen compounds, any cross-linking accelerator generally used in dip molding can be used. Examples thereof include dithiocarbamic acid compounds, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbamoylthio)benzothiazole, 2-(2,6-dimethyl-4-morpholinothio)benzothiazole, 2-(4'-morpholinodithio) benzothiazole, 4-morpholinyl-2-benzothiazyl disulfide, 1,3-bis(2-benzothiazyl mercaptomethyl)urea, and the like. Among these, zinc diethyldithiocarbamate, zinc dibutyldithiocarbamate, and zinc 2-mercaptobenzothiazole are preferable, and a use of a combination of these three is more preferable. One of the cross-linking accelerators may be used alone, or two or more of them may be used in combination. Meanwhile, dithiocarbanic acid compounds and zinc salts thereof, and zinc 2-mercaptobenzothiazole are preferably substantially not contained (the amount thereof is preferably 0.1 parts by weight or less with respect to 100 parts by weight of the conjugated diene polymer) from the viewpoint of producing a dip-molded article which can suitably avoid delayed (Type IV) allergic reactions.

The content of the cross-linking accelerator in the latex composition according to the present invention is preferably 0.01 to 10 parts by weight, more preferably 0.1 to 7 parts by weight, further more preferably 0.5 to 5 parts by weight with respect to 100 parts by weight of the conjugated diene polymer. Controlling the content of the cross-linking accelerator within the above ranges can suppress an increase in the hardness of the resulting dip-molded article while further enhancing the tensile strength thereof.

The latex composition according to the present invention preferably further contains an activating agent. The activating agent may be any compound capable of activating cross-linking, and examples thereof include, but are not limited to, metal oxides. Metal oxides are preferable because in the case where the carboxy-modified conjugated diene polymer is used as the conjugated diene polymer, metal oxides act as a cross-linking agent to cross-link carboxyl groups of the carboxy-modified polymer, thereby resulting in a dip-molded article having enhanced tensile strength.

Examples of metal oxides include, but are not limited to, zinc oxide, magnesium oxide, titanium oxide, calcium oxide, lead oxide, iron oxide, copper oxide, tin oxide, nickel oxide, chromium oxide, cobalt oxide, aluminum oxide, and the like. Among these, zinc oxide is preferable from the viewpoint of producing a dip-molded article having further improved tensile strength. One of these metal oxides may be used alone, or two or more of them may be used in combination.

The content of the activating agent in the latex composition according to the present invention is preferably 0.01 to 30 parts by weight, more preferably 0.1 to 10 parts by weight, further more preferably 0.5 to 5 parts by weight with respect to 100 parts by weight of the conjugated diene polymer, although not particularly limited thereto. When the content of the activating agent falls within the above ranges, a dip-molded article having further improved tensile strength can be obtained.

The latex composition according to the present invention can further contain optional compounding agents including an antioxidant; a dispersant; a reinforcer such as carbon black, silica, or talc; a filler such as calcium carbonate and clay; an ultraviolet absorber; and a plasticizer.

Examples of antioxidants include sulfur atom-free phenolic antioxidants such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester antioxidants such as tris (nonylphenyl) phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensation products; quinoline antioxidants such as 6-ethoxy-2,2,4-trimethyl-1,2-dihydroquinoline; hydroquinone antioxidants such as 2,5-di-(t-amyl)hydroquinone; and the like. One of these antioxidants may be used alone, or two or more of them may be used in combination.

The content of such antioxidant(s) in the latex composition according to the present invention is preferably 0.05 to 10 parts by weight, more preferably 0.1 to 5 parts by weight with respect to 100 parts by weight of the conjugated diene polymer.

The latex composition according to the present invention can be prepared by any method without limitation. Examples thereof include a method involving mixing the silicone-based surfactant and the optional compounding agents described above in the conjugated diene polymer latex described above, and the like. In this case, a method of preparing an aqueous dispersion of ingredients other than the conjugated diene polymer latex, and thereafter mixing the aqueous dispersion with the conjugated diene polymer latex and the like can also be used. In the case where the cross-linking accelerator is used (in particular, in the case where the xanthogen compound is used as the cross-linking accelerator), it is preferable that the cross-linking accelerator and a polyoxyalkylene-based surfactant be mixed into an aqueous dispersion in advance, and used in the form of an aqueous dispersion.

The solids content of the latex composition according to the present invention is preferably 10 to 60 wt %, more preferably 10 to 55 wt %.

From the viewpoint of producing a dip-molded article having sufficient mechanical properties, the latex composition according to the present invention is preferably subjected to aging (pre-crosslinking) before being dip molded. The temperature during aging (pre-vulcanization) is preferably 20 to 40° C., although not particularly limited thereto.

The dip-molded article according to the present invention can be obtained by dip molding the latex composition according to the present invention. Since the dip-molded article according to the present invention is formed by dip molding the latex composition according to the present invention, the dip-molded article according to the present invention can be formed as one with a thin film thickness, and has excellent film thickness uniformity and excellent tensile strength even in such a case where the film thickness is thin (for example, the film thickness is 100 μm or less).

The dip molding is a method involving immersing a mold in the latex composition to deposit the composition on the surface of the mold, then pulling the mold out of the composition, and thereafter drying the composition deposited on the surface of the mold. The drying conditions may be appropriately selected. The mold before the immersion in the latex composition may be preheated.

Examples of the dip molding include depositing a coagulant on a mold by immersing the mold in a coagulant solution before immersion in the latex composition (anode coagulant dipping); immersing a mold on which the latex composition has been deposited in a coagulant solution (Teague coagulant dipping); depositing the latex composition on a mold without using a coagulant (direct dipping), and the like. The dip-molded article according to the present invention is preferably obtained by the direct dipping from the viewpoint of producing a dip-molded article having a thin film thickness.

In the direct dipping, a mold is immersed in the latex composition, and then pulled up, and the latex composition deposited on the surface of the mold is solidified by drying or the like, forming a dip-molded layer on the mold. The drying conditions may be appropriately selected. In the direct dipping, in order to suppress a pinhole and unevenness in the appearance, double dipping is commonly used in which after a first dip-molded layer is formed on a mold, the mold having the dip-molded layer formed thereon is again immersed in the latex composition, and then pulled up, and dried or the like, thereby forming a second dip-molded layer on the mold. In the case where the dip-molded article according to the present invention is obtained by the double dipping, the latex composition according to the present invention is preferably used for both the first dip molding and the second dip molding from the viewpoint of enhancing the film thickness uniformity and the tensile strength of the dip-molded article. Specifically, preferably, after the first dip-molded layer is formed by dip molding the latex composition according to the present invention, the second dip-molded layer is formed by dip molding the latex composition according to the present invention on the first dip-molded layer. By such a method, a dip-molded article including the first dip-molded layer formed by dip molding the latex composition according to the present invention, and the second dip-molded layer formed on the first dip-molded layer by dip molding the latex composition according to the present invention can be obtained.

In the direct dipping, since a coagulant is not used, a dip-molded article which has a thin film thickness and can avoid residual coagulant can be obtained. On the other hand, dip molding only one time (that is, the case where only one layer is formed by dip molding) may cause a structural defect such as a pinhole because the film thickness is thin. From the viewpoint of suppressing such a structural defect such as a pinhole, a method in which the dip molding is performed multiple times to produce multiple dip-molded layers can be possible, but the studies by the present inventor have revealed that the multiple dip-molded layers have a problem in which an additionally formed layer fails to have sufficient compatibility with the underlying layer, causing repellency, unevenness, and the like, which makes difficult to ensure film thickness uniformity. In response to the problem, the present inventor has made intensive studies, and found that the latex composition according to the present invention described above can effectively solve such a problem, and thereby excellent film thickness uniformity and excellent tensile strength can be achieved even when the dip-molded article is obtained by the direct dipping, particularly by the double dipping. In addition, the use of the direct dipping, particularly the double dipping can provide a dip-molded article having a thinner film thickness.

Next, the dip-molded layer deposited on the mold is cross-linked by heating. The dip-molded layer can be cross-linked by heat treatment typically at a temperature of 80 to 150° C., preferably for 10 to 130 minutes. As a heating method, external heating methods using infrared rays or heated air or internal heating methods using high-frequency waves can be employed. Among these, external heating using heated air is preferable. Before the heat treatment, the dip-molded layer may be immersed in water, preferably hot water at 30 to 70° C. for about 1 to 60 minutes to remove water-soluble impurities (such as excess emulsifier and coagulant). Although the removal of water-soluble impurities may be performed after the heat treatment of the dip-molded layer, the removal process is preferably performed before the heat treatment to more efficiently remove the water-soluble impurities.

Then, a dip-molded article is obtained by detaching the dip-molded layer from the mold for dip molding. As a detaching method, a method of peeling the film from the mold by hand or a method of peeling the film by water pressure or pressure of compressed air can be employed. After the detachment, heat treatment at a temperature of 60 to 120° C. for 10 to 120 minutes may be further performed.

The film thickness of the dip-molded article is preferably 10 to 500 μm, more preferably 10 to 100 μm, particularly preferably 10 to 50 μm. The dip-molded article according to the present invention has excellent film thickness uniformity and excellent tensile strength even in the case where the film thickness is thin (for example, the film thickness is 100 μm or less).

The dip-molded article according to the present invention can be used, for example, as medical supplies such as baby bottle nipples, droppers, tubes, water pillows, balloon stalls, catheters, condoms, and probe covers; toys such as balloons, dolls, and balls; industrial supplies such as pressure molding bags and gas storage bags; fingerstalls; and the like.

In particular, the dip-molded article according to the present invention, which has excellent film thickness uniformity and excellent tensile strength even in the case where the film thickness is thin, can be particularly suitably used as medical supplies having a thin film thickness, such as medical gloves, condoms, and probe covers.

EXAMPLES

Hereinafter, the present invention will be specifically described with reference to Examples. However, the present invention is not limited to these examples. The "part(s)" below is on a weight basis unless otherwise specified. The physical properties were measured as follows.

<Solids Content>

From each sample, 2 g (weight: X2) was accurately weighed on an aluminum dish (weight: X1), followed by drying in a hot air dryer at 105° C. for 2 hours. Subsequently, after cooling in a desiccator, the weight thereof (weight: X3) including the aluminum dish was measured to calculate the solids content according to the following calculation formula.

$$\text{Solids content (wt \%)}=(X3-X1)\times 100/X2$$

<Degree of Modification of Carboxy-Modified Synthetic Polyisoprene>

The number of carboxyl groups in the carboxy-modified synthetic polyisoprene contained in each carboxy-modified synthetic polyisoprene latex was determined by neutralization titration of the carboxy-modified synthetic polyisoprene in the carboxy-modified synthetic polyisoprene latex using a sodium hydroxide aqueous solution. Then, the degree of modification with a monomer having a carboxyl group was determined using the formula below based on the determined number of carboxyl groups.

$$\text{Degree of modification (wt \%)}=(X/Y)\times 100$$

In the formula above, X represents the weight of units of the monomer having a carboxyl group in the carboxy-modified synthetic polyisoprene, and Y represents the weight of the carboxy-modified synthetic polyisoprene.

<Storage Stability>

The latex composition was aged (pre-vulcanized) for 48 hours in a temperature-constant water tank adjusted to 25° C. The aging time in total was 96 hours. Then, the resulting latex composition after aging was weighed, and thereafter filtered with a 200 mesh sieve. The weight of the residual aggregate on the sieve was measured. The aggregation ratio was calculated using the formula below.

$$\text{Aggregation ratio (\%)}=\text{weight of aggregate}\div\text{weight of latex composition after aging}\times 100$$

The storage stability of the latex composition was evaluated based on the above calculated aggregation ratio according to the following criteria.

⊚: The aggregation ratio is 0%. (There was no residual aggregate on the sieve.)

○: The aggregation ratio is greater than 0% and less than 1%.

Δ: The aggregation ratio is greater than or equal to 1% and less than 5%.

X: The aggregation ratio is greater than or equal to 5%.

<Appearance of Dip-Molded Layer>

In Examples and Comparative Examples, after a first dip-molded layer was formed, the first dip-molded layer was visually observed for the presence or absence of a part where the dip-molded layer was not formed, and the presence or absence of film thickness unevenness. Further, after a second dip-molded layer was formed, the second dip-molded layer was visually observed in the same manner. The appearance was considered as good when the part where the dip-molded layer was not formed was not observed and film thickness unevenness was not observed.

<Film Thickness Uniformity>

Ten points were selected for measurement in such a way that each point was within 3 cm from a location on a dip-molded article corresponding to a location of a glass mold which was in contact with a latex composition for the longest time (the top of the glass mold) when the glass mold was immersed in the latex composition. Then, the thickness at each of the ten points selected was measured to calculate the arithmetic average of the thicknesses at the ten points measured, and thus the film thickness of the dip-molded article was determined. Further, the standard deviation σ of the ten points measured above was calculated, and 3σ (a value three times of the standard deviation σ) was determined. When the film thicknesses are comparable, a smaller 3σ is considered as better film thickness uniformity.

<Tensile Strength>

In accordance with ASTM D624-00, each dip-molded article was allowed to stand still in a constant-temperature, constant-humidity room at 23° C. and at a relative humidity of 50% for 24 hours or more, and then was punched out using a dumbbell (trade name "Die C", available from DUMBBELL CO., LTD.) to prepare a test piece for tear strength measurement. The test piece was stretched at a stretching speed of 500 mm/min using a TENSILON Universal Material Testing Instrument (trade name "RTG-1210", available from A&D Company, Limited) to measure tear strength (unit: N/mm)). A dip-molded article with a higher tear strength is considered as having higher tear strength.

Example 1

(Production of Carboxy-Modified Synthetic Polyisoprene (A-1) Latex)

Synthetic polyisoprene (trade name "NIPOL IR2200L", available from Zeon Corporation) was mixed with n-hexane (boiling point: 69° C.), and was dissolved therein by heating to 60° C. with stirring to prepare an n-hexane solution (a) of the synthetic polyisoprene having a synthetic polyisoprene concentration of 15 wt %.

Meanwhile, potassium rosinate was added to water, and was dissolved therein by heating to 60° C. Thus, an emulsifier aqueous solution (b) (concentration: 1.5 wt %) was prepared.

Next, the n-hexane solution (a) of the synthetic polyisoprene and the emulsifier aqueous solution (b) prepared above were mixed using a mixer (trade name "Multi Line mixer MS26-MMR-5.5L", available from SATAKE CHEMICAL EQUIPMENT MFG., LTD.) in such proportions that the amount of potassium rosinate in the emulsifier aqueous solution (b) was 10 parts with respect to 100 parts of the synthetic polyisoprene in the n-hexane solution (a) of the synthetic polyisoprene. The mixture was then mixed and emulsified at a rotational speed of 4100 rpm using an emulsifying apparatus (trade name "MILDER MDN310", available from Pacific Machinery & Engineering Co., Ltd.) to give an emulsified dispersion (c). In this process, the total feed flow rate of the n-hexane solution (a) of the synthetic polyisoprene and the emulsifier aqueous solution (b) was controlled at 2,000 kg/hr, the temperature was controlled at 60° C., and the back pressure (gauge pressure) was controlled at 0.5 MPa.

Subsequently, the emulsified dispersion (c) was heated to 80° C. under a reduced pressure of −0.01 to −0.09 MPa (gauge pressure) to distill off n-hexane and afford an aqueous dispersion (d) of the synthetic polyisoprene. In this process, a defoaner (trade name "SM5515", available from Dow Corning Toray Co., Ltd.) was continuously added by spraying the defoamer in an amount of 300 ppm by weight with respect to the synthetic polyisoprene in the emulsified dispersion (c). In the process of distilling off n-hexane, the emulsified dispersion (c) was adjusted to 70 vol % or less of the tank volume, and was gradually stirred at 60 rpm using a three-bladed inclined paddle as a stirring blade.

After the completion of distilling off of n-hexane, the aqueous dispersion (d) of the synthetic polyisoprene obtained was concentrated by centrifugation at 8,000 to 9,000 G using a continuous centrifuge (trade name "SRG510", available from Alfa Laval AB) to give a synthetic polyisoprene latex (e) with a solids content of 60 wt % as a light liquid. The conditions for centrifugation were as follows: the solids content of the aqueous dispersion (d) before centrifugation was 8 wt %; the flow rate during continuous centrifugation was 1300 kg/hr; and the back pressure (gauge pressure) of the centrifuge was 0.1 MPa.

Subsequently, after dilution with 130 parts of distilled water with respect to 100 parts of the synthetic polyisoprene in the synthetic polyisoprene latex (e) thus obtained, a solution of 0.8 parts (with respect to 100 parts of the synthetic polyisoprene) of the sodium salt of a condensation product of μ-naphthalene sulfonic acid and formalin (trade name "DEMOL T-45", available from Kao Corporation) as a dispersant diluted with 4 parts (with respect to 100 parts of the synthetic polyisoprene) of distilled water was added to the synthetic polyisoprene latex (e) over 5 minutes. Next, the synthetic polyisoprene latex (e) containing the dispersant was fed into a nitrogen-purged reactor provided with a stirrer, and was warmed to 30° C. with stirring. In another reactor, a diluted solution of methacrylic acid was prepared by mixing 3 parts of methacrylic acid as a carboxyl group-containing compound and 16 parts of distilled water. The diluted solution of methacrylic acid was added over 30 minutes to the reactor controlled at 20° C.

Further, a solution (f) composed of 7 parts of distilled water, 0.32 parts of sodium formaldehyde sulfoxylate (trade name "SFS", available from MITSUBISHI GAS CHEMICAL COMPANY, INC.), and 0.01 parts of ferrous sulfate (trade name "Frost Fe", available from CHELEST CORPORATION) was prepared in another reactor. After the solution (f) was transferred to the former reactor, 0.5 parts of 1,1,3,3-tetramethylbutyl hydroperoxide (trade name "PEROCTA H", available from NOF CORPORATION) was added thereto to allow the contents to react at 20° C. for 1 hour, followed by concentration in a centrifuge to yield a carboxy-modified synthetic polyisoprene (A-1) latex. The resulting carboxy-modified synthetic polyisoprene (A-1) latex was measured for degree of modification in accordance with the method described above to give a degree of modification of 0.5 mol %.

(Preparation of Aqueous Dispersion of Sulfur)

0.5 Parts of sulfur, 0.03 parts (6.0 parts with respect to 100 parts of sulfur) of the sodium salt of a condensation product of β-naphthalene sulfonic acid and formalin (trade name "DEMOL T-45", available from Kao Corporation) as an anionic surfactant, 0.004 parts of a 5% potassium hydroxide aqueous solution, and 0.42 parts of water were pulverized by mixing with a ball mill (trade name "porcelain ball mill" available from NITTO KAGAKU Co., Ltd.) to prepare an aqueous dispersion of sulfur as a cross-linking agent. The conditions of mixing with the ball mill were as follows: ϕ10 mm to ϕ35 mm ceramic porcelain balls (a mixture of ϕ10 mm, ϕ15 mm, ϕ20 mm, ϕ25 mm, ϕ30 mm, and ϕ35 mm ceramic porcelain balls) were used, and the mixing was performed at 50 rpm for 72 hours.

(Preparation of Aqueous Dispersion of Xanthogen Compound)

2.5 Parts of zinc diisopropyl xanthate (trade name "NOCCELER ZIX", available from Ouchi Shinko Chemical Industrial Co., Ltd., volume average particle size: 14 μm, 95% volume-based cumulative particle size (D95): 55 μm) as a xanthogen compound, 0.45 parts (18.0 parts with respect to 100 parts of zinc diisopropyl xanthate) of polyoxyethylene distyrenated phenyl ether (trade name "EMULGEN A-60", available from Kao Corporation) as a non-ionic surfactant, and 2.05 parts of water were pulverized by mixing with a ball mill (trade name "porcelain ball mill" available from Nitto Kagaku Co., Ltd.) to prepare an aqueous dispersion of the xanthogen compound as a cross-linking accelerator. The conditions of mixing with the ball mill were as follows: ϕ10 mm to ϕ35 mm ceramic porcelain balls (a mixture of ϕ10 mm, ϕ15 mm, ϕ20 mm, ϕ25 mm, and ϕ35 mm ceramic porcelain balls) were used, and the mixing was performed at 50 rpm for 72 hours.

(Preparation of Latex Composition)

While the carboxy-modified synthetic polyisoprene (A-1) latex prepared above was being stirred, 1.0 part (on a sulfur basis) of the aqueous dispersion of sulfur as the cross-linking agent prepared above, 2.5 parts (on a zinc diisopropyl xanthate basis) of the aqueous dispersion of the xanthogen compound as the cross-linking accelerator prepared above, and 1.0 part of a polyether-based surfactant (trade name "DOWSIL SH3746", side chain-modified polyether-modified dimethyl silicone represented by general formula (3) in which $X^1$ represents a polyether group, and $R^1$, $R^2$, and $R^3$ all represent a methyl group, available from Dow Toray Co., Ltd., silicon atom content: 3.8 wt %, HLB value: 16) were added with respect to 100 parts of the carboxy-modified synthetic polyisoprene (A-1) in the carboxy-modified synthetic polyisoprene (A-1) latex. Subsequently, the solids content of the polymer latex was adjusted to 40 wt %.

On a solids basis with respect to 100 parts of the carboxy-modified synthetic polyisoprene (A-1) in the resulting mixture, 1.5 parts of zinc oxide as an activating agent, and 2 parts of an antioxidant (trade name "Wingstay L", available from Goodyear Tire and Rubber Company) were added as aqueous dispersions of the compounding agents to the mixture under stirring. Further, the mixture was aged (pre-vulcanized) for 48 hours in a temperature-constant water tank controlled at 25° C. to provide a latex composition. The latex composition dip-molded article obtained was evaluated for the storage stability according to the method described above. The results are shown in Table 1.

(Production of Dip-Molded Article)

The latex composition obtained above and a glass mold were used to produce a dip-molded article by direct dipping. Specifically, the glass mold was immersed in the latex composition for 15 seconds, and pulled out of the latex composition. Then, the latex composition deposited on the glass mold was dried at 80° C. for 5 minutes to thereby form a first dip-molded layer. Further, the glass mold having the first dip-molded layer formed thereon was again immersed in the latex composition for 15 seconds, and pulled out of the latex composition. Subsequently, the latex composition deposited on the glass mold having the first dip-molded layer formed thereon was dried at 80° C. for 5 minutes, and immersed in hot water at 60° C. for 5 minutes for leaching to thereby form a second dip-molded layer. The first and the second dip-molded layers were evaluated for the appearance, and the results are shown in Table 1.

Next, a heat treatment was performed at 120° C. for 20 minutes to vulcanize (post-vulcanize) the carboxy-modified synthetic polyisoprene (A-1) in the first and the second dip-molded layers to thereby form a dip-molded article. The dip-molded article was then peeled from the glass mold to obtain a dip-molded article. The dip-molded article obtained was evaluated and measured for the film thickness uniformity and the tensile strength according to the method described above. The results are shown in Table 1.

Examples 2 and 3, and Comparative Examples 1 to 4

Latex compositions were obtained in the same manner as in Example 1 except that the type and the amount of the silicone-based surfactant used were changed as listed in Table 1, and dip-molded articles were further obtained. The dip-molded articles were evaluated, observed, and measured in the same manner as in Example 1. The results are shown in Table 1. In Comparative Example 1, the silicone-based surfactant was not used. In Comparative Example 3, a dip-molded article could not be formed.

TABLE 1

| | Latex composition | | | | | | | | Evaluation | | | | | |
|---|---|---|---|---|---|---|---|---|---|---|---|---|---|---|
| | Conjugated diene polymer latex | | Cross-linking agent | Cross-linking accelerator | Silicone-based surfactant | | | | | Appearance of dip-molded layer | | Film thickness uniformity | | |
| | Type | Compounded amount of conjugated diene polymer (part) | Compounded amount (part) | Compounded amount (part) | Name | Si content (wt %) | Modifying group | Compounded amount (part) | Storage stability | First dip-molded layer | Second dip-molded layer | Film thickness (μm) | 3σ (μm) | Tensile strength (MPa) |
| Example 1 | (A-1) | 100 | 1.0 | 2.5 | DOWSIL SH3746 | 3.8 | polyether | 1.0 | ◎ | Good | Good | 29.8 | 2.5 | 23.1 |
| Example 2 | (A-1) | 100 | 1.0 | 2.5 | KP-110 | 4.0 | polyether | 1.0 | ◎ | Good | Good | 28.9 | 4.1 | 22.8 |
| Example 3 | (A-1) | 100 | 1.0 | 2.5 | DOWSIL SH8400 | 8.2 | polyether | 1.0 | ◎ | Slight film thickness unevenness observed | Good | 30.1 | 5.5 | 22.4 |
| Comparative Example 1 | (A-1) | 100 | 1.0 | 2.5 | — | — | — | — | ◎ | Good | Film thickness unevenness observed | 33.6 | 10.1 | 22.1 |
| Comparative Example 2 | (A-1) | 100 | 1.0 | 2.5 | TPA4380 | 0.6 | polyether | 1.0 | ○ | Good | Second layer partially not formed | 26.3 | 12.2 | 18.2 |
| Comparative Example 3 | (A-1) | 100 | 1.0 | 2.5 | KF-6015 | 15 | polyether | 1.0 | Δ | First layer partially not formed, film thickness unevenness observed | Film thickness unevenness observed | Cannot be measured | Cannot be measured | Cannot be measured |
| Comparative Example 4 | (A-1) | 100 | 1.0 | 2.5 | DOWSIL SM5512 | >50 | — | 1.0 | Δ | Good | Film thickness unevenness observed | 33.2 | 11.8 | 21.4 |

The silicone-based surfactant used was as follows.

DOWSIL SH3746: side chain-modified polyether-modified dimethyl silicone represented by general formula (3) in which $X^1$ represents a polyether group, and $R^1$, $R^2$, and $R^3$ all represent a methyl group, available from Dow Toray Co., Ltd., silicon atom content: 3.8 wt %, HLB value: 16

KP-110: polyether-modified silicone, available from Shin-Etsu Chemical Co., Ltd., silicon atom content: 4.0 wt %

DOWSIL SH8400: side chain-modified polyether-modified dimethyl silicone represented by general formula (3) in which $X^1$ represents a polyether group, and $R^1$, $R^2$, and $R^3$ all represent a methyl group, available from Dow Toray Co., Ltd., silicon atom content: 8.2 wt %, HLB value: 8

TPA4380: polyether-modified silicone, available from Toshiba Silicone Co., Ltd., silicon atom content: 0.6 wt %

KF-6015: polyether-modified silicone, available from Shin-Etsu Chemical Co., Ltd., silicon atom content: 15 wt %

DOWSIL SM5512: silicone antifoan emulsion, available from Dow Toray Co., Ltd., silicon atom content: greater than 50 wt %

As shown in Table 1, the latex compositions comprising the conjugated diene polymer latex, and the silicone-based surfactant having a silicon atom content of 1.5 to 10 wt % had excellent storage stability, and could provide a dip-molded article having a thin film thickness, excellent film thickness uniformity, and excellent tensile strength. (Examples 1 to 3).

On the other hand, when the silicone-based surfactant was not contained, or the silicon atom content in the silicone-based surfactant was too small, the dip-molded articles obtained had poor film thickness uniformity (Comparative Examples 1 and 2).

When the silicon atom content in the silicone-based surfactant was too large, the latex composition obtained had poor storage stability, and furthermore, a dip-molded article could not be formed (Comparative Example 3), or the dip-molded article obtained had poor film thickness uniformity (Comparative Example 4).

The invention claimed is:

1. A latex composition comprising a conjugated diene polymer latex and a silicone-based surfactant having a silicon atom content of 1.5 to 10 wt %, wherein the latex composition is a mixture of the conjugated diene polymer latex and the silicone-based surfactant, and the solids content of the latex composition is 10 to 60 wt %.

2. The latex composition according to claim 1, further comprising a cross-linking agent.

3. The latex composition according to claim 1, further comprising a cross-linking accelerator.

4. The latex composition according to claim 3, wherein the cross-linking accelerator is a xanthogen compound.

5. The latex composition according to claim 1, wherein the conjugated diene polymer is at least one selected from synthetic polyisoprenes, natural rubbers, and styrene-isoprene-styrene block copolymers.

6. The latex composition according to claim 1, wherein the silicone-based surfactant is a polyether-modified silicone.

7. The latex composition according to claim 1, wherein the silicone-based surfactant has an HLB value of 2 to 18.

8. The latex composition according to claim 1, wherein the content of the silicone-based surfactant is 0.1 to 5 parts by weight with respect to 100 parts by weight of the conjugated diene polymer.

9. The latex composition according to claim 1, wherein the silicone-based surfactant is a side chain-modified silicone.

10. A dip-molded article formed by dip molding the latex composition according to claim 1.

11. The latex composition according to claim 1, wherein the silicone-based surfactant includes a side chain-modified silicone represented by general formula (3) below;

(3)

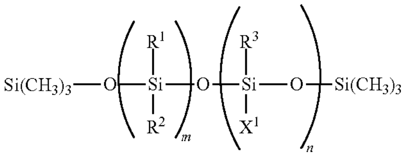

in general formula (3), $R^1$, $R^2$, and $R^3$ are each a hydrogen atom or a methyl group, $X^1$ is a modifying group, m is an integer of 0 or more, and n is an integer of 1 or more.

12. The latex composition according to claim 1, wherein the conjugated diene polymer is an acid-modified conjugated diene polymer.

13. The latex composition according to claim 1, wherein the conjugated diene polymer is a carboxy-modified conjugated diene polymer.

14. The latex composition according to claim 1, wherein the degree of modification of the carboxy-modified conjugated diene polymer with a monomer having a carboxyl group is 0.01 to 10 wt %.

15. The latex composition according to claim 1, further comprising a metal oxide as an activating agent.

16. The latex composition according to claim 1, further comprising an antioxidant.

17. The dip-molded article according to claim 10, wherein the film thickness of the dip-molded article is 100 μm or less.

* * * * *